J. HARRINGTON & S. A. CHAPMAN.
Ice-Cutting Machines.
No. 147,934.  Patented Feb. 24, 1874.
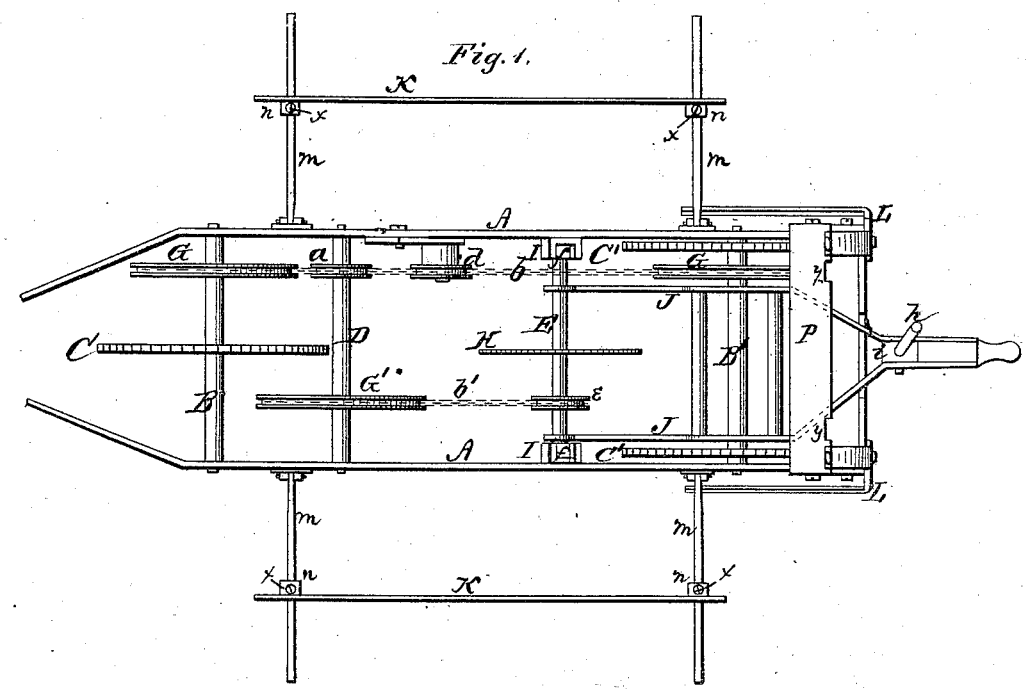
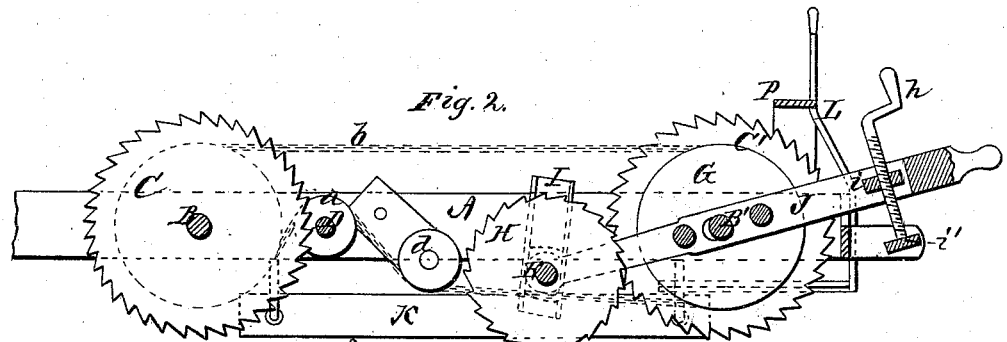
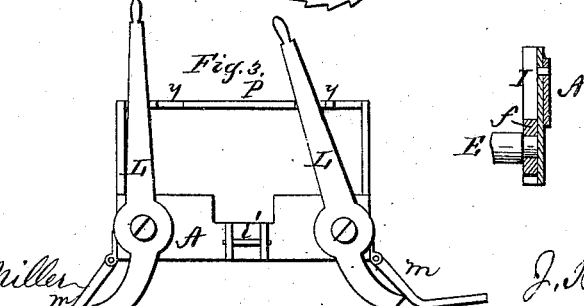
WITNESSES.
Henry N. Miller
C. L. Evert.
INVENTOR
J. Harrington
S. A. Chapman
By Alexander Mason
Attorneys.

UNITED STATES PATENT OFFICE.

JACKSON HARRINGTON AND SIMEON A. CHAPMAN, OF NEW LONDON, CONN.

IMPROVEMENT IN ICE-CUTTING MACHINES.

Specification forming part of Letters Patent No. 147,934, dated February 24, 1874; application filed July 30, 1873.

*To all whom it may concern:*

Be it known that we, JACKSON HARRINGTON and SIMEON A. CHAPMAN, of New London, in the county of New London and State of Connecticut, have invented certain new and useful Improvements in Machines for Cutting Ice; and we do hereby declare the following to be a full, clear, and exact description thereof, reference being had to the accompanying drawing and to the letters of reference marked thereon.

Our invention relates to such machines for cutting ice in which a circular saw is operated by chains from the driving-wheel shafts; and the nature of our invention consists in the construction and arrangement of the saw-arbor, with its bearings and the devices for raising and lowering the saw according to the thickness of the ice. It also consists in the arrangement of adjustable side gages with the devices for raising and lowering the same, as will be hereinafter more fully set forth.

In order to enable others skilled in the art to which our invention appertains to make and use the same, we will now proceed to describe its construction and operation, referring to the annexed drawing which forms a part of this specification, and in which—

Figure 1 is a plan view, Fig. 2 a longitudinal section, and Fig. 3 a rear end view, of our machine for cutting ice.

A represents the frame of our machine, constructed in any suitable manner, and containing, near the front end, a wheel-shaft or axle, B, and near the rear end a similar shaft or axle, B'. In a full-sized machine these shafts or axles are to be placed, and turn in boxes attached to the frame A. The front axle B has in the center a wheel, C, keyed or otherwise firmly secured to it, while the rear axle B' has a wheel, C', at each end. These wheels C and C' C' are all toothed on their edges, so as to take hold of the ice and revolve, as the machine is moved forward. Between the wheel-shafts B B' is a counter-shaft, D, and saw-shaft or arbor E, both running across the frame, and parallel with the saw-shafts. Each of the wheel-shafts is provided, near one side of the frame, with a large pulley, G, and around these pulleys passes a chain, b. The lower part of this chain passes over a pulley, a, on the counter-shaft D, and under an idle pulley, d, attached to a stud on the inner side of the frame. This idle pulley is for the purpose of causing the chain b to touch the circumference of the pulley a as far around as possible, and cause the counter-shaft to revolve in the opposite direction to the wheels C and C'. On the counter-shaft D is a large pulley, G', connected, by another chain, b', with a pulley, e, on the saw-shaft E, so as to cause the saw H on said shaft to revolve in the same direction as the counter-shaft D; or, in other words, in the opposite direction to the wheels and the movement of the machine. All the pulleys over which the chains b b' pass are grooved circumferentially, sufficiently deep to retain the chains on the same. The saw-shaft E runs in boxes f f placed in grooved guides I I, attached to the inner sides of the frame A. The shaft E passes through two levers, J J, which are placed loosely upon the rear axle B', they having each an oblong slot where said axle passes through them; and their rear ends are bent and united together, as shown in Fig. 1. Between the rear ends of the levers J J is pivoted a nut, i, through which passes a screw-shaft or crank-screw, h, the lower end of which turns in a plate or box, i', pivoted between two ears, extending from the rear end of the frame A.

By turning the crank-screw h the saw H is raised and lowered at will, and held in any position necessary according to the thickness of ice. On each side of the frame A are hinged or pivoted two or more arms, m m, upon which is placed a gage, K, said gage having hubs n n, through which the arms m m pass, and set-screws x x through said hubs secure the gage on the arms.

On the rear end of the frame A, near each side, is pivoted a bent lever, L, the lower front end of which is underneath the rear arm m on that side of the machine. By the use of these levers L L, the gages K K may be raised up from the ice or lowered to the same; and when raised up they are held in that position by the upper ends of the levers entering notches y y in a cross-bar, P, on the frame.

Having thus fully described our invention, what we claim as new, and desire to secure by Letters Patent, is—

1. The combination of the saw-shaft E, boxes $ff$, guides I I, levers J J, crank-screw $h$, pivoted nut $i$, and pivoted box $i'$, all constructed and arranged to operate substantially as and for the purposes herein set forth.

2. The combination of the hinged or pivoted arms $m\ m$, gage K with hubs $n\ n$ and set-screws $x\ x$, lever L, and notched bar P, all substantially as and for the purposes herein set forth.

JACKSON HARRINGTON.
SIMEON A. CHAPMAN.

Witnesses:
F. P. KENYON,
LEWIS Y. CARROLL.